United States Patent
Kasama et al.

(10) Patent No.: US 9,423,270 B2
(45) Date of Patent: Aug. 23, 2016

(54) ELECTRONIC DEVICE AND MOTION STATE JUDGMENT METHOD

(75) Inventors: Kouichirou Kasama, Kawasaki (JP); Toshihiro Azami, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 1062 days.

(21) Appl. No.: 13/559,833

(22) Filed: Jul. 27, 2012

(65) Prior Publication Data
US 2013/0041619 A1 Feb. 14, 2013

(30) Foreign Application Priority Data
Aug. 12, 2011 (JP) ................................. 2011-177031

(51) Int. Cl.
G01P 15/00 (2006.01)
G01C 22/00 (2006.01)
G06F 11/30 (2006.01)

(52) U.S. Cl.
CPC .................................... *G01C 22/006* (2013.01)

(58) Field of Classification Search
CPC ...................................................... G01C 22/006
See application file for complete search history.

(56) References Cited

U.S. PATENT DOCUMENTS

| | | |
|---|---|---|
| 2008/0190201 A1 | 8/2008 | Makino |
| 2010/0191697 A1 | 7/2010 | Fukumoto |

FOREIGN PATENT DOCUMENTS

| | | | |
|---|---|---|---|
| JP | 2007-226371 A | | 9/2007 |
| JP | 2007226371 | * | 9/2007 |
| JP | 2008-262522 A | | 10/2008 |
| JP | 2010-198595 A | | 9/2010 |
| JP | 2010-257395 A | | 11/2010 |

OTHER PUBLICATIONS

Office Action of Japanese Patent Application No. 2011-177031 dated Feb. 10, 2015 with Partial Translation.

* cited by examiner

*Primary Examiner* — Phuong Huynh
(74) *Attorney, Agent, or Firm* — Maschoff Brennan (57) ABSTRACT

An electronic device includes: a sensor that detects a triaxial direction acceleration; and a processor operable to calculate axial components in the triaxial directions of a gravitational acceleration from detection values of the sensor, to determine a ratio of a magnitude of the gravitational acceleration with respect to the axial components of an axial direction of the triaxial directions, to determine a vertical acceleration magnitude according to the ratio and the detection values of the sensor in the axial direction, and to judge whether or not a motion state is a running state according to the vertical acceleration magnitude.

12 Claims, 5 Drawing Sheets

FIG. 5

ELECTRONIC DEVICE AND MOTION STATE JUDGMENT METHOD

CROSS-REFERENCE TO RELATED APPLICATION

This application is based upon and claims the benefit of priority of the prior Japanese Patent Application No. 2011-177031, filed on Aug. 12, 2011, the entire contents of which are incorporated herein by reference.

FIELD

Aspects of the present embodiments relate to an electronic device, and a motion state judgment method that judges whether the motion state of a user is running or not.

BACKGROUND

An item that judges a motion state (walking, running, going up or down stairs) from accelerations in the vertical and advancing directions outputted from a triaxial acceleration sensor is known as a pedometer that judges whether or not the motion state of a user is running.

Additionally, an information processor apparatus is known that calculates a walking/running judgment frequency and a walking/running judgment variance from sensor data made by sensing a user's motions. The information processor apparatus then judges whether the user is walking or running according to the product of the walking/running judgment frequency and the walking/running judgment variance.

Japanese Laid-open Patent Publication No. 2008-262522 and Japanese Laid-open Patent Publication No. 2010-198595 are examples of related art.

As described above, judging the magnitude of a vertical acceleration is used when judging whether or not the user is in a running state based on the acceleration in the vertical direction. If the relation between the axis detected by the acceleration sensor and the vertical direction is not fixed, the vertical acceleration is computed from a sensor detection value according to the sensor orientation. In this case, the large amount of computing to conduct repetitive operations to derive the vertical acceleration is limited to hardware that includes a judgment function.

SUMMARY

According to an aspect of the invention, an electronic device includes: An electronic device includes: a sensor that detects a triaxial direction acceleration; and a processor operable to calculate axial components in the triaxial directions of a gravitational acceleration from detection values of the sensor, to determine a ratio of a magnitude of the gravitational acceleration with respect to the axial components of an axial direction of the triaxial directions, to determine a vertical acceleration magnitude according to the ratio and the detection values of the sensor in the axial direction, and to judge whether or not a motion state is a running state according to the vertical acceleration magnitude.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
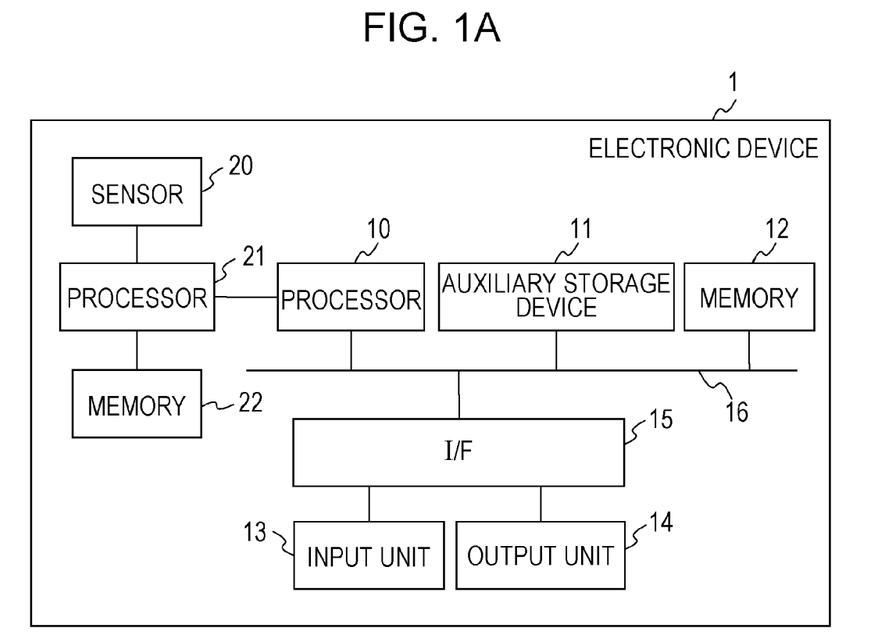
FIG. 1A illustrates an example hardware configuration of an electronic device.
Figure 1B:
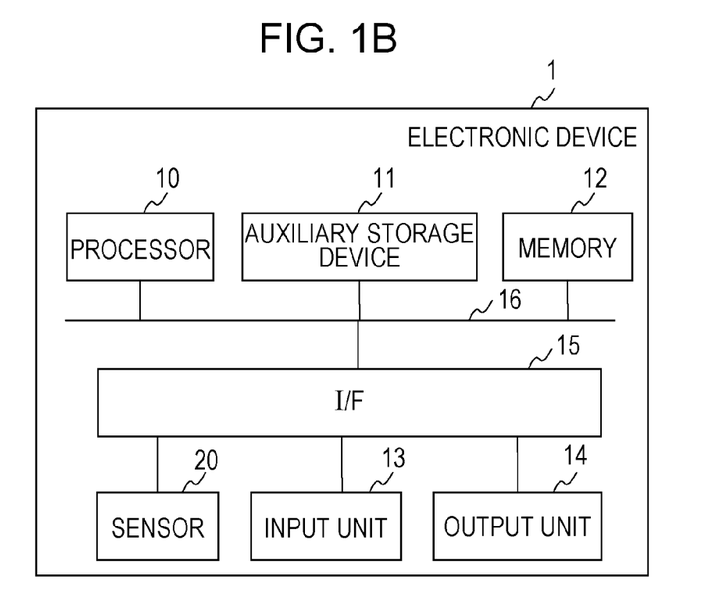
FIG. 1B illustrates an example hardware configuration of an electronic device.

The embodiments of the present disclosure will be explained hereinbelow with reference to the attached drawings. FIGS. 1A and 1B each illustrate an example hardware configuration of an electronic device. An electronic device 1 includes a function to judge whether or not a motion state of a user carrying the electronic device 1 is a running state. The electronic device 1 is, for example, a portable electronic device carried by the user. The electronic device 1 may be, for example, a portable telephone, a portable music player, a digital camera, an electronic pedometer, a portable clock, a tablet computer, or a Personal Digital Assistant (PDA), and the like, but is not limited to such devices.

In an exemplary hardware configuration of FIG. 1A, the electronic device 1 is equipped with a first processor 10, an auxiliary storage device 11, a memory 12, an input unit 13, an output unit 14, an interface 15, a sensor 20, a second processor 21, and a memory 22. The accompanying drawings depict an interface as "I/F".

The first processor 10 performs processing to control operations of the electronic device 1 according to the execution of control programs stored in the auxiliary storage device 11. The first processor 10 performs application processing corresponding to the usage by the user of the electronic device according to application programs stored in the auxiliary storage device 11. The auxiliary storage device 11 stores the abovementioned control programs and application programs. The auxiliary storage device 11 may include a non-volatile memory, a Read Only Memory (ROM), or a hard-disk and the like as a memory element.

The memory unit 12 stores programs currently being activated by the first processor 10 and data temporarily used by such programs. The memory 12 may include a Random Access Memory (RAM). The input unit 13 is an input device that receives input operations from the user. The input unit 13 may be, for example, a keypad, a keyboard, a pointing device, a touch panel, or a microphone and the like.

The output unit 14 is an output device that outputs signals processed by the electronic device 1. For example, the output unit 14 may be a display device for visually displaying information processed by the electronic device 1 to the user. The output unit 14 may be, for example, a liquid crystal display, a Cathode Ray Tube (CRT) display, or an organic electro-luminescence display. The output unit 14 may also be a speaker that outputs audio signals and a drive circuit thereof. The interface 15 is an interface circuit to connect the input unit 13 and the output unit 14 to a data bus 16. The first processor 10, the auxiliary storage device 11, the memory 12, and the interface 15 are electrically connected through the data bus 16.

The sensor 20 is a sensor for detecting accelerations applied to the sensor 20 in each triaxial direction. The sensor 20 may be, for example, a piezoresistance type of triaxial acceleration sensor that uses a piezoresistance effect, or a capacitance type of triaxial acceleration sensor that uses changes in capacitance. The axial directions of acceleration detected by the sensor 20 are depicted as the x-axis, the y-axis, and the z-axis.

The second processor 21 is a processor to control the sensor 20 and hardware built into the electronic device 1. For example, the second processor 21 executes acceleration measuring using the sensor 20. The second processor 21 may be, for example, a dedicated, built-in microcomputer. The memory 22 stores programs executed by the second processor 21. The memory 22 may be, for example, a non-volatile memory, and may be incorporated into the built-in microcomputer along with the second processor 21 in an embodiment.

FIG. 1B illustrates another hardware configuration example of the electronic device 1. In this configuration example, the sensor 20 is connected to the interface 15 through the data bus 16. The measuring of the acceleration using the sensor 20 is implemented by the first processor 10.

The hardware configurations illustrated in FIGS. 1A and 1B are merely exemplary hardware configurations of the electronic device 1. Other hardware configurations may be used so long as such configurations execute the processing described herein.

Figure 2:
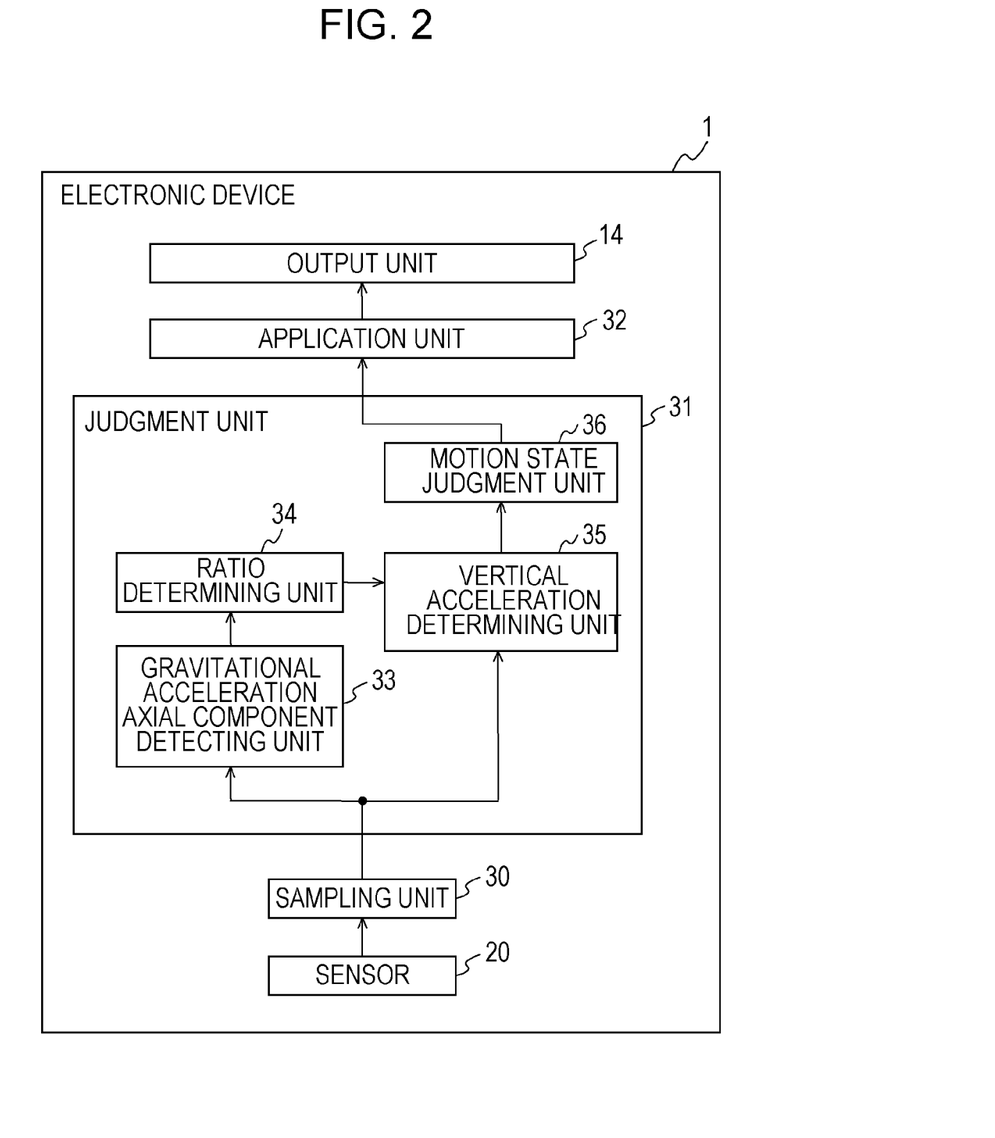
FIG. 2 is a schematic configuration of an example of an electronic device.

FIG. 2 is a schematic configuration of an example of an electronic device. The electronic device 1 is equipped with an output unit 14, a sensor 20, a sampling unit 30, a judgment unit 31, and an application unit 32. FIG. 2 mainly illustrates the functions relating to the following explanation.

The output unit 14 and the sensor 20 respectively correspond to the output unit 14 and the sensor 20 illustrated in FIGS. 1A and 1B. Processing by the application unit 32 is executed by the first processor 10 that executes the application programs stored in the auxiliary storage device 11.

Processing conducted by the sampling unit 30 and the judgment unit 31 is executed by the second processor 21 that executes the programs stored in the memory 22 in the exemplary hardware configuration illustrated in FIG. 1A. Alternatively, the processing conducted by the sampling unit 30 may be executed by the second processor 21 that executes the programs stored in the memory 22, and the processing conducted by the judgment unit 31 may be executed by the first processor 10 that executes the programs stored in the auxiliary storage device 11. Processing conducted by the sampling unit 30 and the judgment unit 31 is executed by the first processor 10 that executes the programs stored in the auxiliary storage device 11 in the exemplary hardware configuration illustrated in FIG. 1B.

The following is a detailed description of the constituent elements in FIG. 2. The sampling unit 30 periodically conducts sampling of accelerations of the x, y, and z axes detected by the sensor 20. The frequency of the sampling unit 30 to obtain detection values may be, for example, every 20 ms. The sampling unit 30 outputs a result of the detection of the axial accelerations obtained by the sampling to the judgment unit 31.

The judgment unit 31 judges whether or not a motion state of a user carrying the electronic device 1 is a running state based on the axial accelerations detected by the sensor 20. The judgment unit 31 includes a gravitational acceleration axial component detecting unit 33, a ratio determining unit 34, a vertical acceleration determining unit 35, and a motion state judgment unit 36.

The gravitational acceleration axial component detecting unit 33 detects gravitational acceleration axial components according to accelerations of each axis detected by the sensor 20. For example, the gravitational acceleration axial component detecting unit 33 may calculate direct current components $Xdc$, $Ydc$, and $Zdc$ of acceleration changes of the respective x, y, and z axes as gravitational acceleration axial components. The gravitational acceleration axial component detecting unit 33 may also at this time calculate an average value of the x, y, and z axes over a certain period of time as the direct current components $Xdc$, $Ydc$, and $Zdc$.

The ratio determining unit 34 determines a ratio R of a gravitational acceleration magnitude with respect to an axial component of at least one specific axial direction of the axial components $Xdc$, $Ydc$, and $Zdc$ based on the axial components $Xdc$, $Ydc$, and $Zdc$ of the gravitational acceleration. An example of a method to determine the ratio R will be explained with reference to FIG. 3. The following explanation describes as a "specific axis" the axis direction for which the ratio R of the gravitational acceleration magnitude with respect to the axial components among the x, y, and z axes is determined. The following explanation describes an embodiment in which the specific axis is the X-axis.

Figure 3:
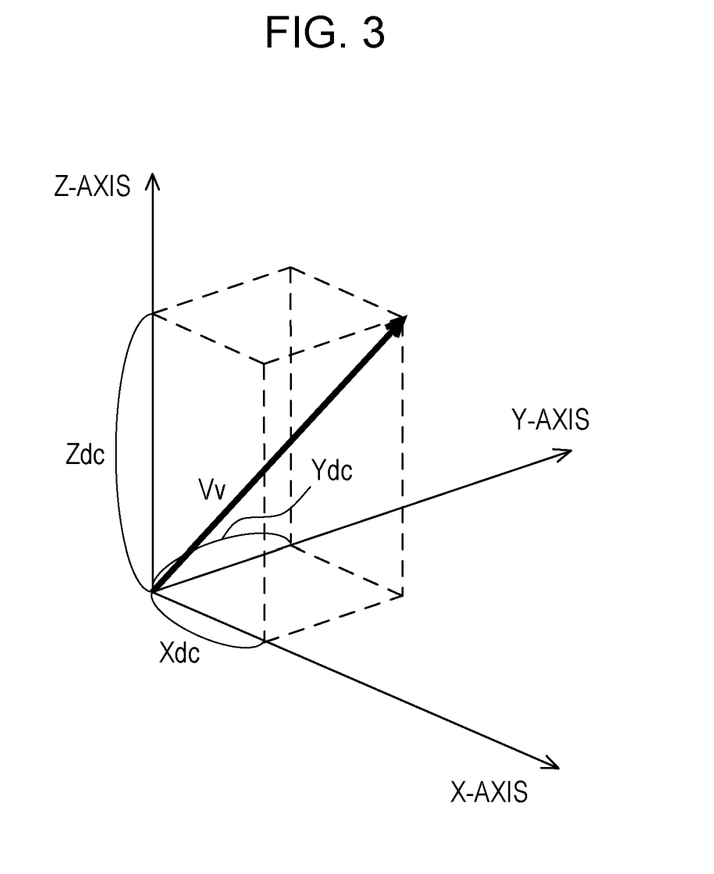
FIG. 3 is an example of a ratio R determining method.

A vector Vv that indicates the gravitational acceleration direction and magnitude is determined as illustrated in FIG. 3 when the axial components of the gravitational acceleration are given as $Xdc$, $Ydc$, and $Zdc$. The gravitational acceleration magnitude $|Vv|$ at this time is derived by the following equation (1).

$$|Vv|=\sqrt{(Xdc^2+Ydc^2+Zdc^2)} \quad (1)$$

The ratio R is derived by the following equation (2).

$$\text{Ratio } R=|Vv|/Xdc \quad (2)$$

Since the vector Vv indicating the gravitational acceleration direction is pointing in the vertical direction, the ratio R is a ratio of the magnitude of the vector pointing in the vertical direction and the x-axis component of the same vector. Therefore, when acceleration pointing in the vertical direction is applied to the sensor 20, the magnitude of the vertical direction acceleration may be calculated by multiplying the ratio R by the acceleration in the x-axis detected at that time.

The ratio determining unit 34 stores the calculated ratio R and the gravitational acceleration axial component $Xdc$ of the X-axis direction that is the specific axis in the memory 22 or the memory 12. Specifically, the ratio R and the axial component $Xdc$ are stored in the memory 22 when the processing by the ratio determining unit 34 is executed by the second processor 21. The ratio R and the axial component $Xdc$ are stored in the memory 12 when the processing by the ratio determining unit 34 is executed by the first processor 10.

Referring back to FIG. 2, the vertical acceleration determining unit 35 obtains an acceleration $Dx$ of the specific axis, namely the X-axis direction, detected by the sensor 20 accompanying a motion by the user at a time after the ratio R is stored in a memory. The vertical acceleration determining unit 35 uses the following equation (3) to calculate an x-axis component $Mx$ of motion acceleration that is acceleration due to the motion by the user by subtracting the gravitational acceleration component $Xdc$ stored in the memory from the acceleration $Dx$.

$$Mx=(Dx-Xdc) \quad (3)$$

The vertical acceleration determining unit 35 uses the following equation (4) to calculate a product $Av$ of the motion acceleration X-axis component $Mx$ and the ratio R stored by the ratio determining unit 34.

$$Av=Mx \times R \quad (4)$$

Figure 4:
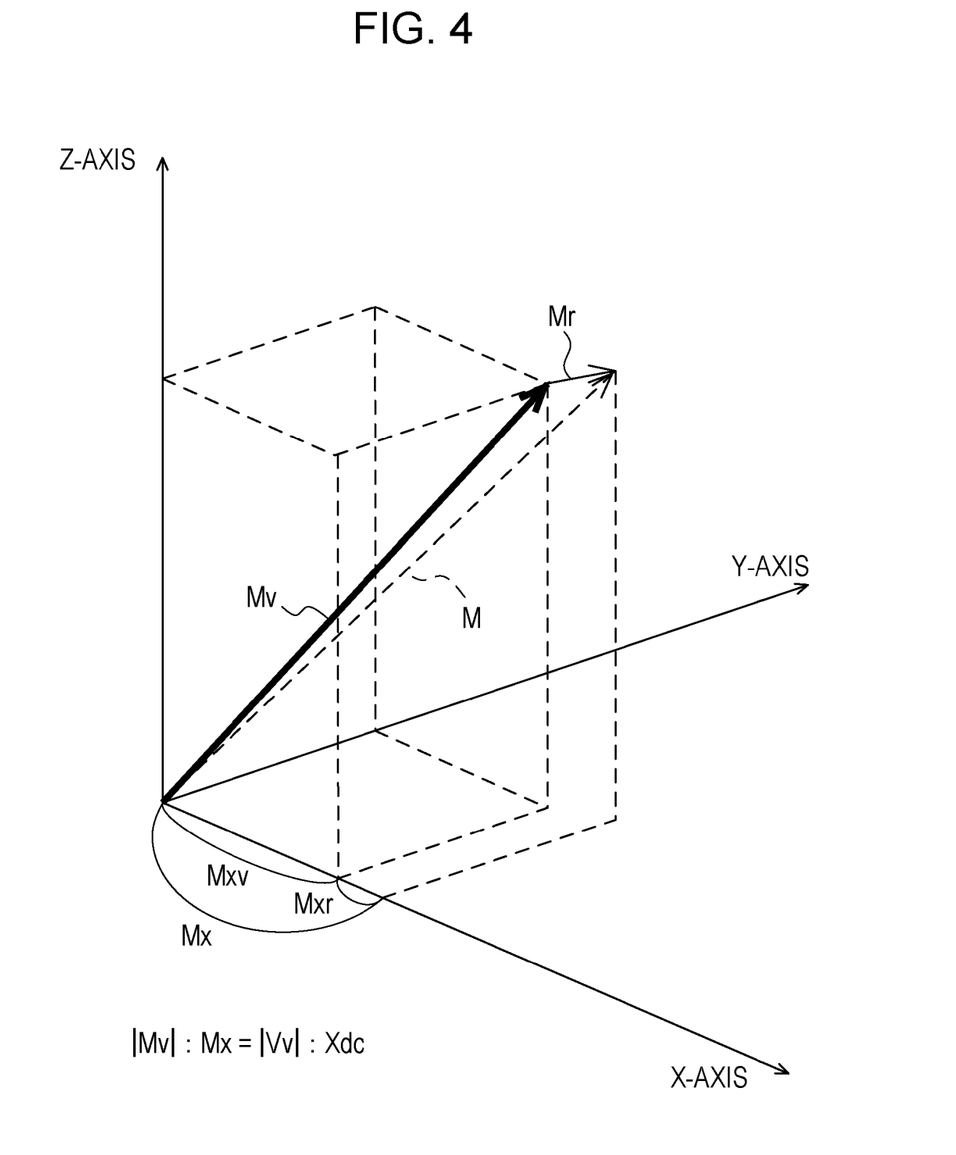
FIG. 4 describes components of user motion acceleration.

A relationship between the value of the product $Av$ and the motion acceleration caused by a motion of the user will be explained. FIG. 4 illustrates components of motion acceleration caused by a user motion. A motion acceleration vector M includes a vertical acceleration Mv that is a vertical component and another component Mr. A motion acceleration X-axis component Mx is divided into an x-axis component Mxv of the vertical acceleration Mv and another component Mxr.

Since the vertical acceleration Mv is pointing in the vertical direction, a ratio (|Mv|:Mxv) of the magnitude of the vertical acceleration |Mv| and the x-axis component Mx thereof is equal to a ratio (|Vv|:Xdc) of the gravitational acceleration magnitude |Vv| and the x-axis component Xdc thereof. Therefore, the product of the x-axis component Mxv of the vertical acceleration Mv and the abovementioned ratio R is equal to the vertical acceleration magnitude |Mv|. Thus, a value of the product Av from the above equation (4) may be changed to the following equation (5).

$$Av = Mx \times R = Mxv \times R + Mxr \times R = \text{(vertical acceleration magnitude } |Mv|) + Mxr \times R \quad (5)$$

As indicated in equation (5), the first member of the product Av is the vertical acceleration magnitude |Mv|, and the second member is an error component. In this way, the vertical acceleration determining unit 35 computes the vertical acceleration magnitude |Mv| caused by the user motion as the value Av including the error component (Mx×R).

Referring back to FIG. 2, the motion state judgment unit 36 judges whether or not the vertical acceleration Av calculated by the vertical acceleration determining unit 35 is greater than a certain threshold Th. The motion state judgment unit 36 determines that the user is running if the vertical acceleration Av is greater than the certain threshold Th, and determines that the user has entered another motion state if the vertical acceleration Av is not greater than the certain threshold Th. The motion state judgment unit 36 outputs the judgment result to the application unit 32.

The vertical acceleration |Mv| generated while running is noticeably larger than another motion state such as, for example, a vertical acceleration |Mv| generated during walking. Therefore, if the error component (Mxr×R) that is the second member of the equation (5) is suitably small compared to a difference between the vertical accelerations |Mv| while running and while in another motion state, the motion state judgment unit 36 may judge whether or not the user is running by differentiation based on the threshold Th.

The application unit 32 activates the judgment unit 31 when executing running state judgment processing according to an application program. The application unit 32 also terminates the judgment unit 31 when the running state judgment processing is finished. The application unit 32 receives the judgment result from the motion state judgment unit 36 and outputs the judgment result via the output unit 14.

Figure 5:
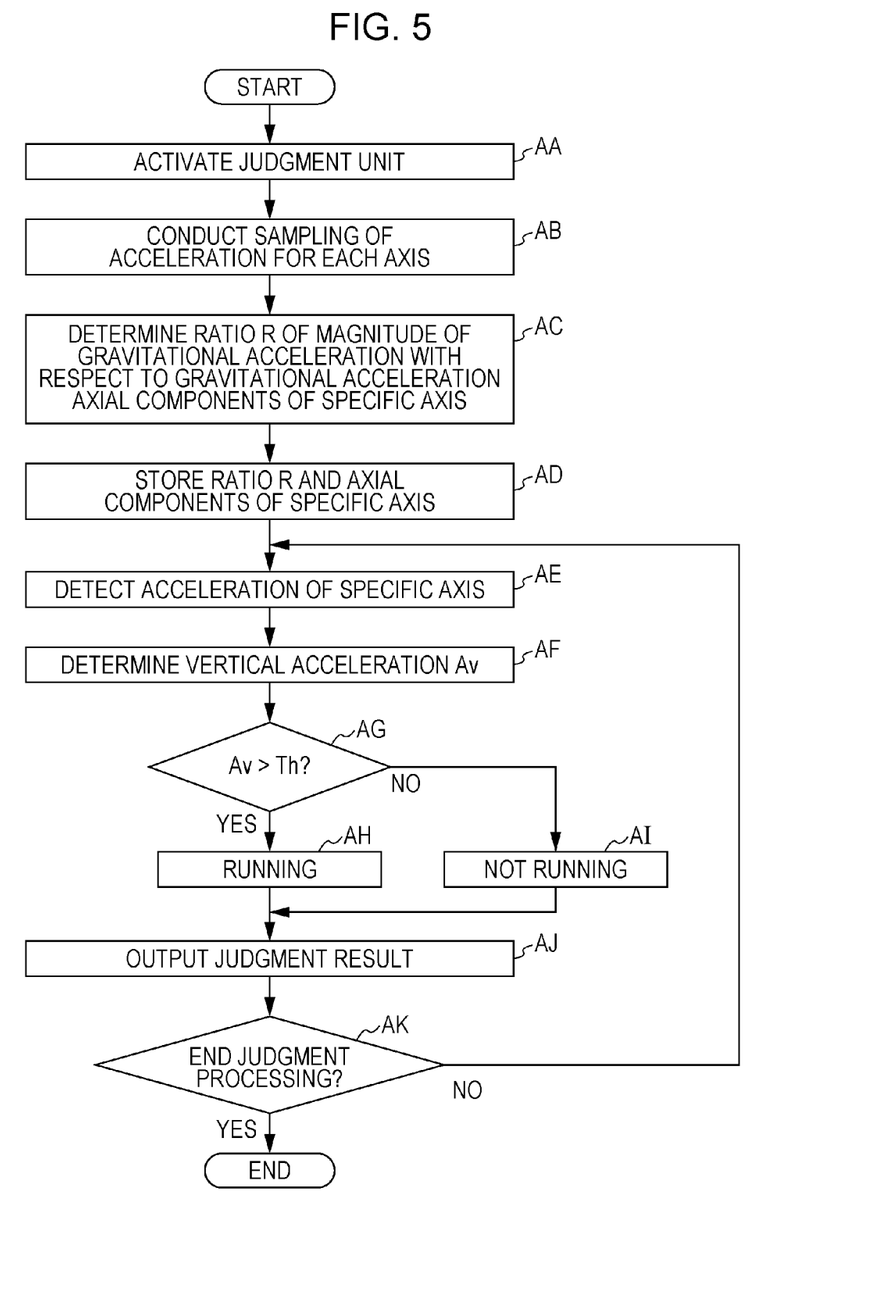
FIG. 5 describes a motion state judgment method.

Next, a motion state judgment method conducted by the abovementioned constituent elements will be explained. FIG. 5 describes a motion state judgment method. The operations described below may be considered steps in other embodiments.

In operation AA, the application unit 32 activates the judgment unit 31. In operation AB, the sampling unit 30 conducts sampling of accelerations of the x, y, and z axes detected by the sensor 20.

In operation AC, the gravitational acceleration axial component detecting unit 33 detects the gravitational acceleration of the axial components Xdc, Ydc, and Zdc based on the sampled accelerations. The ratio determining unit 34 determines the ratio R of the gravitational acceleration magnitude with respect to an axial component of a specific axial direction based on the axial components of the gravitational acceleration. In operation AD, the ratio determining unit 34 stores the ratio R and the axial components of the specific axis in a certain memory.

In operation AE, the sampling unit 30 conducts sampling of the acceleration of the specific axis detected by the sensor 20 accompanying motions by the user. The vertical acceleration determining unit 35 obtains the sampled acceleration of the specific axis. In operation AF, the vertical acceleration determining unit 35 determines the vertical acceleration Av based on the obtained acceleration, the ratio R stored in operation AD, and the axial components of the specific axis.

In operation AG, the motion state judgment unit 36 judges whether or not the vertical acceleration Av is greater than the certain threshold Th. If the vertical acceleration Av is greater than the certain threshold Th (operation AG: Yes), the processing moves to operation AH. If the vertical acceleration Av is not greater than the certain threshold Th (operation AG: No), the processing moves to operation AI.

In operation AH, the motion state judgment unit 36 judges that the user is running. The processing then moves to operation AJ. In operation AI, the motion state judgment unit 36 judges that the user is not running. The processing then moves to operation AJ. In operation AJ, the application unit 32 outputs the judgment result of the motion state judgment unit 36 from the output unit 14.

In operation AK, the application unit 32 determines whether or not the running state judgment processing is finished. If the running state judgment processing is not finished (operation AK: No), the processing returns to operation AE. The operations AE to AK are repeated at a certain frequency according to the ratio R and the axial components of the specific axis stored in the operation AD. If the running state judgment processing is finished (operation AK: Yes), the operation of the judgment unit 31 is terminated and the processing is finished.

According to the present embodiment, the ratio R is calculated and then stored, and the vertical acceleration of the motion acceleration is calculated by repeatedly using the ratio R. As a result, the processing to repeatedly compute the vertical acceleration based on the detection values successively outputted from the sensor 20 may be easily conducted using the above equations (3) and (4). Thus, the vertical acceleration may be easily derived even with hardware having a relatively low processing capacity.

The ratio R changes when the orientation of the electronic device 1 changes such that the relationship between the gravitational acceleration direction and the detection axis direction changes. The frequency of changes in the orientation of the electronic device 1 may be assumed to be very small compared the sampling frequency of the detection values from the sensor 20. Therefore, in an embodiment, the ratio R may be determined only one time after activating the judgment unit 31. In another embodiment, the ratio R may be determined at a frequency that is longer than the detection value sampling frequency. Since the frequency to compute the square root in equation (1) is lower due to the low frequency of determining the ratio R, the processing load on the hardware may be reduced.

Although the x-axis is used as the specific axis in determining the ratio R and the vertical acceleration Av in the abovementioned embodiment, other embodiments may use the y-axis and/or the z-axis as the specific axis.

Next, another embodiment will be explained. There is a risk that the judgment accuracy of the motion state judgment unit 36 may be reduced if the error component (Mx×R) of the vertical acceleration Av in the equation (5) is not small enough compared to the difference of the vertical acceleration

|Mv| between when the user is running and another motion state. Therefore, in the following embodiment, the error component (Mx×R) of the vertical acceleration Av used in the judgment by the motion state judgment unit 36 is reduced.

In an embodiment, an axial direction with the largest axial component among the axial components Xdc, Ydc, and Zdc may be selected as the specific axis. By selecting this direction as the specific axis, the error component (Mxr×R) may be reduced since the ratio R is reduced.

In another embodiment, a plurality of axes among the x, y, and z axes may be used as specific axes and the vertical acceleration Av thereof may be calculated such that the smallest value thereamong may be used in the judgment by the motion state judgment unit 36. The components of the vertical acceleration magnitude |Mv| included in the vertical accelerations Av are fixed regardless of the axial direction. If the smallest one of the vertical accelerations Av calculated for the plurality of axes is selected, the vertical acceleration Av with the smallest error component (Mxr×R) may be selected.

According to the above embodiments, the error component (Mx×R) of the vertical acceleration Av used in the judgment by the motion state judgment unit 36 may be reduced. As a result, the accuracy of judging whether or not the motion state is a running state by the motion state judgment unit 36 may be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic device comprising:
   a sensor that detects a triaxial direction acceleration; and
   a processor operable;
   to calculate axial components in the triaxial directions of a gravitational acceleration from detection values of the sensor;
   to determine a ratio of a magnitude of the gravitational acceleration with respect to the corresponding axial component of an axial direction of the triaxial directions;
   determine a magnitude of a vertical acceleration by multiplying the ratio by a value of a gravitational acceleration component subtracted from the corresponding detection value of the sensor in the axial direction; and
   judge whether or not a motion state is a running state according to the vertical acceleration magnitude.

2. The electronic device according to claim 1, wherein the processor operable to detect the axial components of the gravitational acceleration from a direct current component of the detection values of the sensor, respectively.

3. The electronic device according to claim 1, wherein the processor operable to select an axial direction in which the largest axial component among the axial components is detected, as the axial direction.

4. The electronic device according to claim 1 wherein,
   the processor operable;
   determine the ratio of the magnitude of the gravitational acceleration with respect to the axial components of axial directions of the triaxial directions,
   determine a magnitude of a vertical acceleration according to the ratio and the detection value of the sensor in each of the axial directions, and
   judge whether or not a motion state is a running state according to a smallest value of the determined magnitudes of the vertical acceleration in the axial directions.

5. An electronic device comprising:
   a sensor that operable to detect a triaxial direction acceleration;
   a gravitational acceleration axial component detecting unit that detects axial components in the triaxial directions of a gravitational acceleration from detection values of the sensor;
   a ratio determining unit that determines a ratio of a magnitude of the gravitational acceleration with respect to the corresponding axial component of an axial direction of the triaxial directions;
   a vertical acceleration determining unit that determines a magnitude of a vertical acceleration by multiplying the ratio by a value of a gravitational acceleration component subtracted from the corresponding detection value of the sensor in the axial direction; and
   a motion state judging unit that judges whether or not a motion state is a running state according to the vertical acceleration magnitude.

6. A motion state judging method, comprising:
   detecting a triaxial direction acceleration;
   calculating axial components in the triaxial directions of a gravitational acceleration from detection values of the triaxial direction acceleration;
   determining a ratio of a magnitude of the gravitational acceleration with respect to the corresponding axial component of an axial direction of the triaxial directions;
   determining a magnitude of a vertical acceleration by multiplying the ration by a value of a gravitational acceleration component subtracted from the corresponding detection value of the sensor in the axial direction; and
   judging whether or not a motion state is a running state according to the vertical acceleration magnitude.

7. The electronic device according to claim 5, wherein the gravitational acceleration axial component detecting unit detects the axial components of the gravitational acceleration from a direct current component of the detection values of the sensor, respectively.

8. The electronic device according to claim 5, wherein an axial direction in which the largest axial component among the axial components is detected is selected, as the axial direction.

9. The electronic device according to claim 5 wherein, the ratio determining unit determines the ratio of the magnitude of the gravitational acceleration with respect to the axial components of axial directions of the triaxial directions, the vertical acceleration determining unit determines a magnitude of a vertical acceleration according to the ratio and the detection value of the sensor in each of the axial directions, and the motion state judging unit judges whether or not a motion state is a running state according to a smallest value of the determined magnitudes of the vertical acceleration in the axial directions.

10. The motion state judging method according to claim 6, wherein the axial components of the gravitational acceleration are detected from a direct current component of the detection values of the sensor, respectively.

11. The motion state judging method according to claim 6, further comprising:

selecting an axial direction in which the largest axial component among the axial components is detected, as the axial direction.

12. The motion state judging method according to claim 6 wherein the ratio of the magnitude of the gravitational acceleration with respect to the axial components of axial directions of the triaxial directions is determined,
a magnitude of a vertical acceleration is determined according to the ratio and the detection value of the sensor in each of the axial directions, and
whether or not a motion state is a running state is judged according to a smallest value of the determined magnitudes of the vertical acceleration in the axial directions.

\* \* \* \* \*